Figure 5:
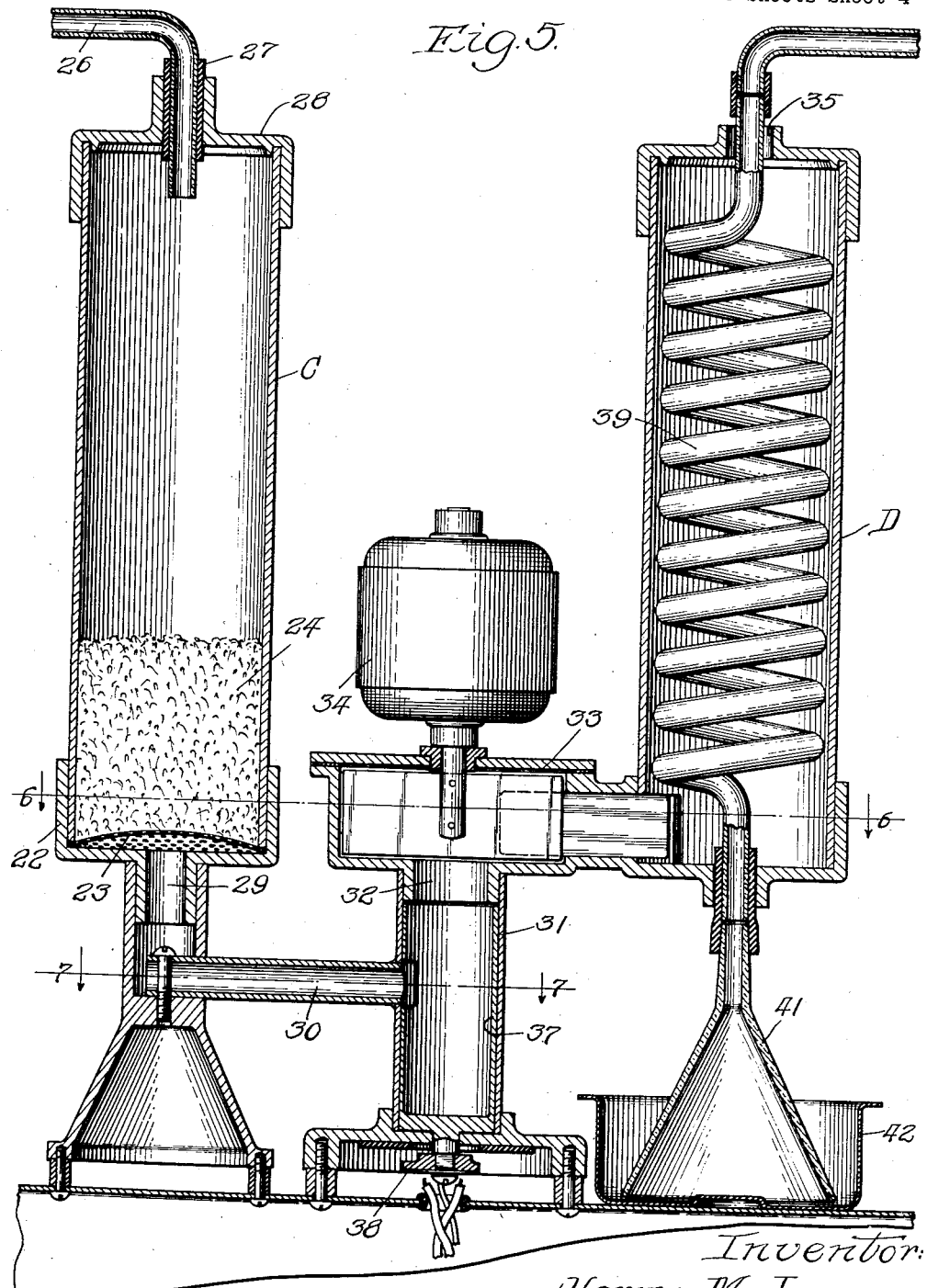

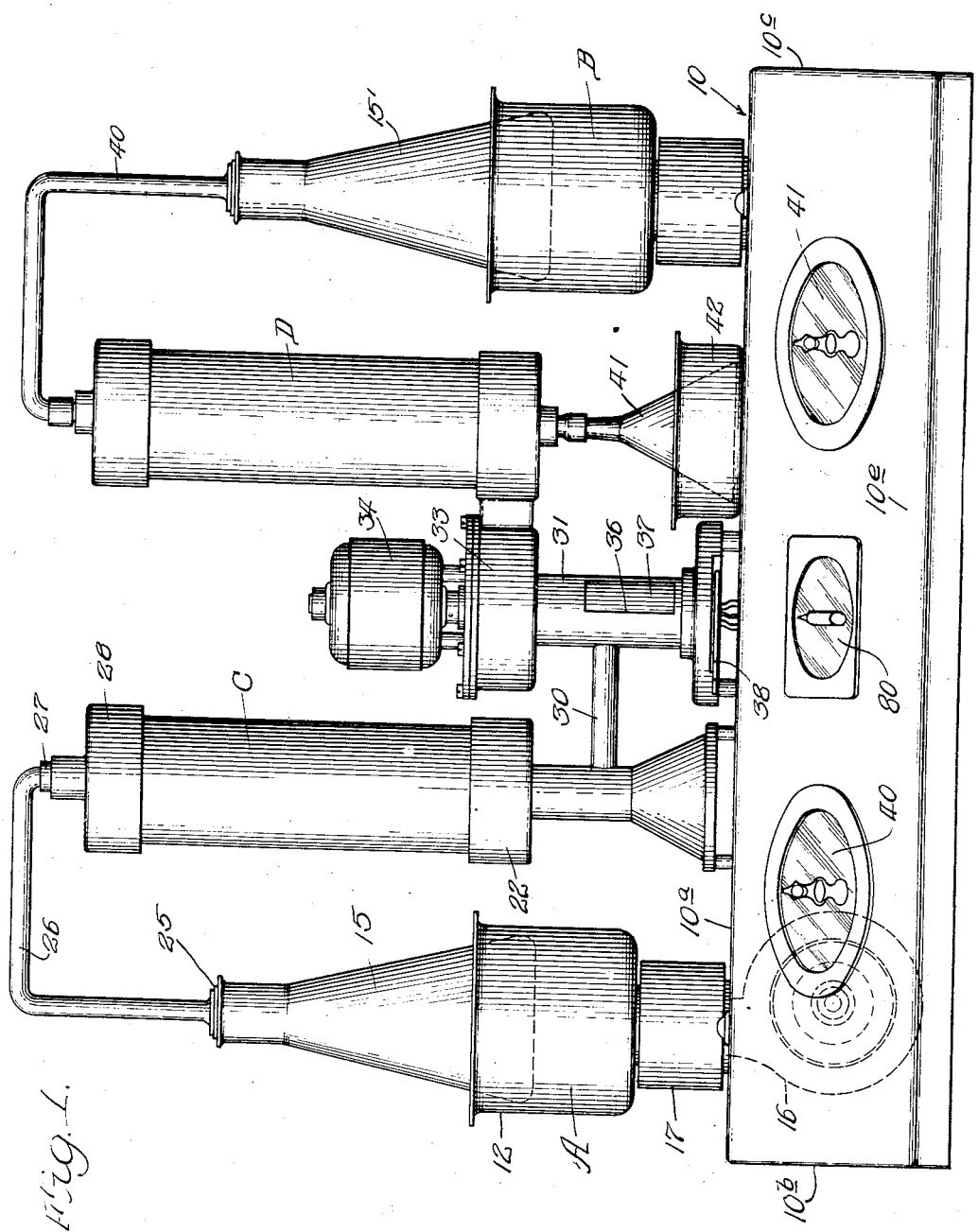

Feb. 21, 1939.     H. M. JONES     2,148,203
APPARATUS FOR CHEMICAL ANALYSIS
Filed Jan. 17, 1938     5 Sheets-Sheet 2
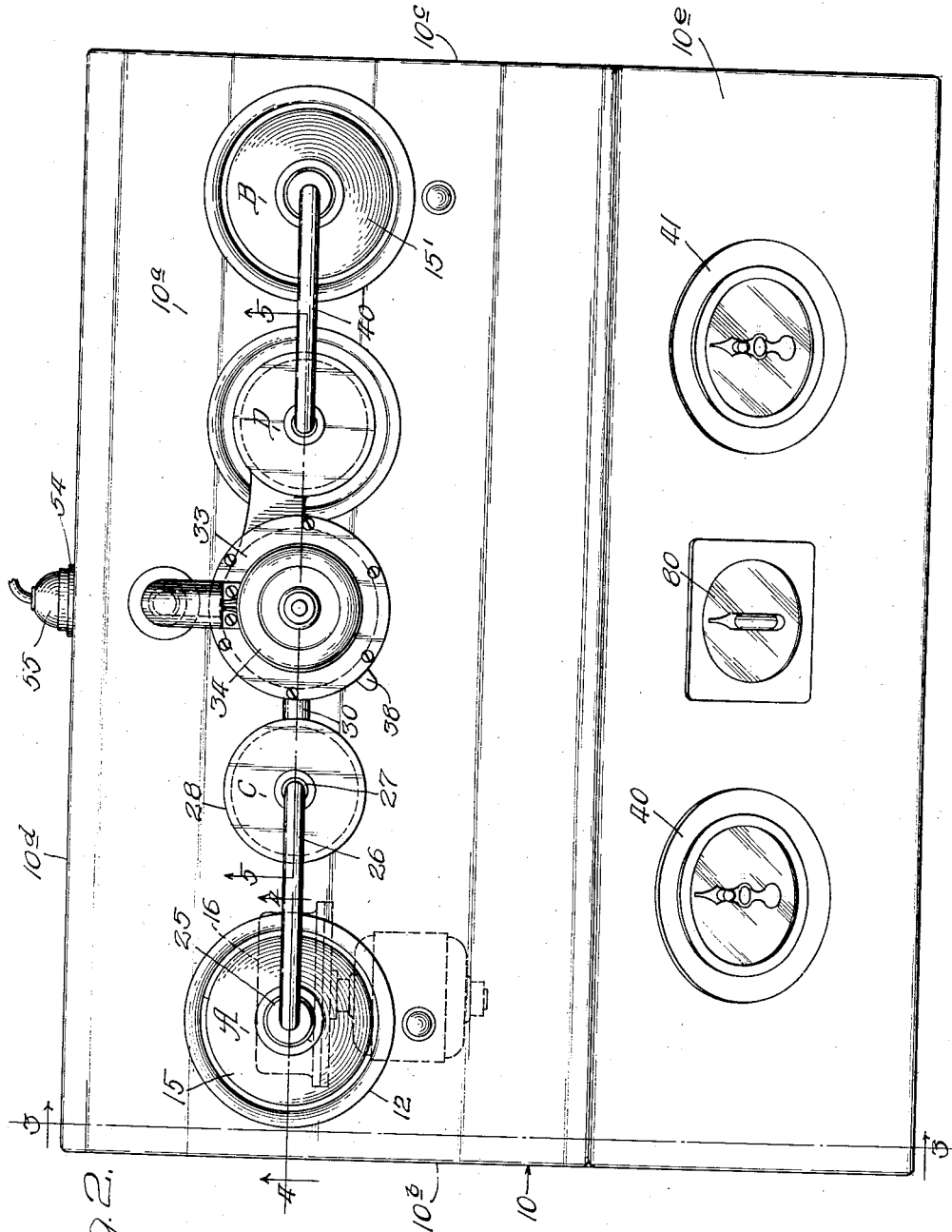
Inventor:
Horry M. Jones,
By Cruton, Wiley, Davies, Hirschl, Dawson,
Attys.

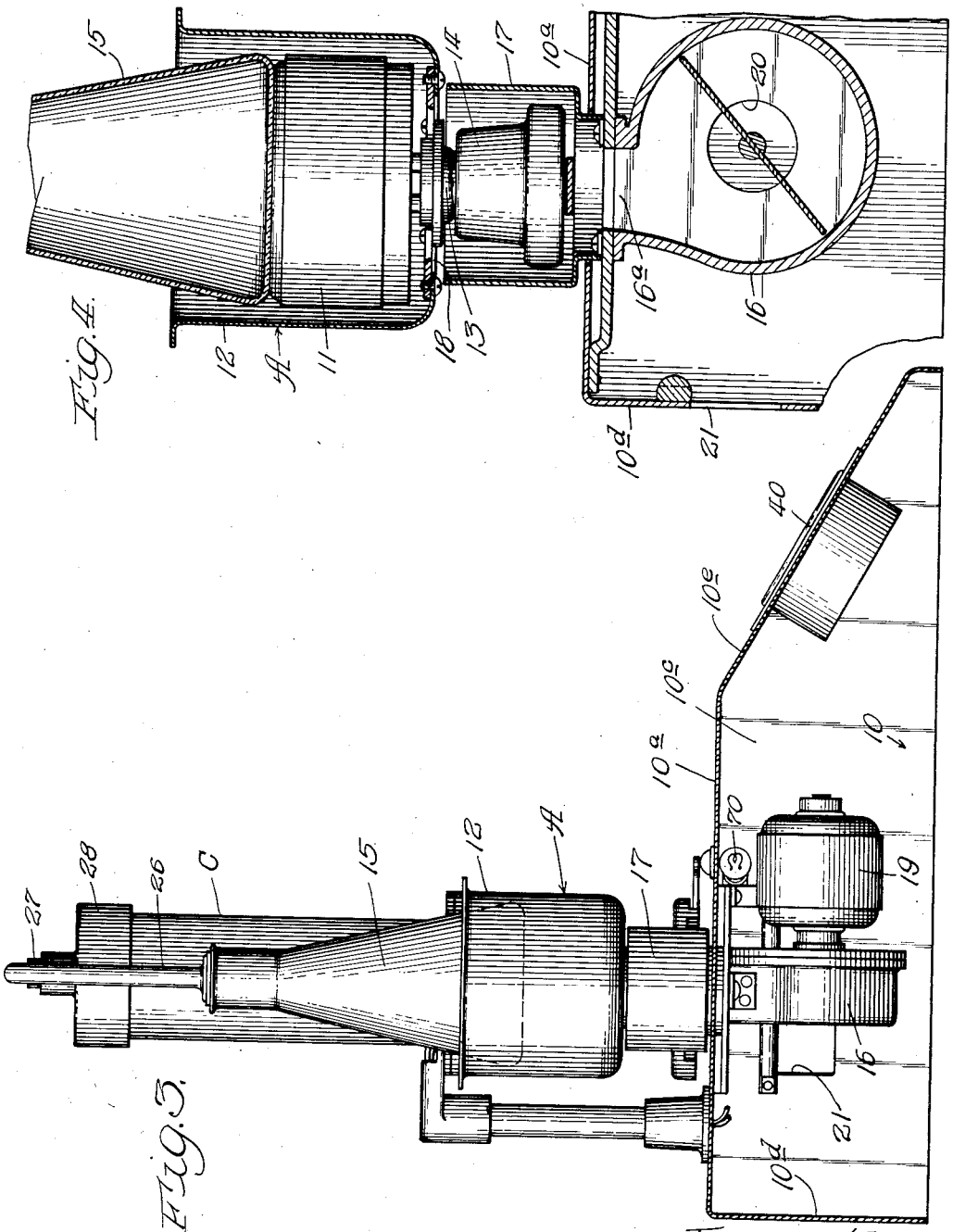

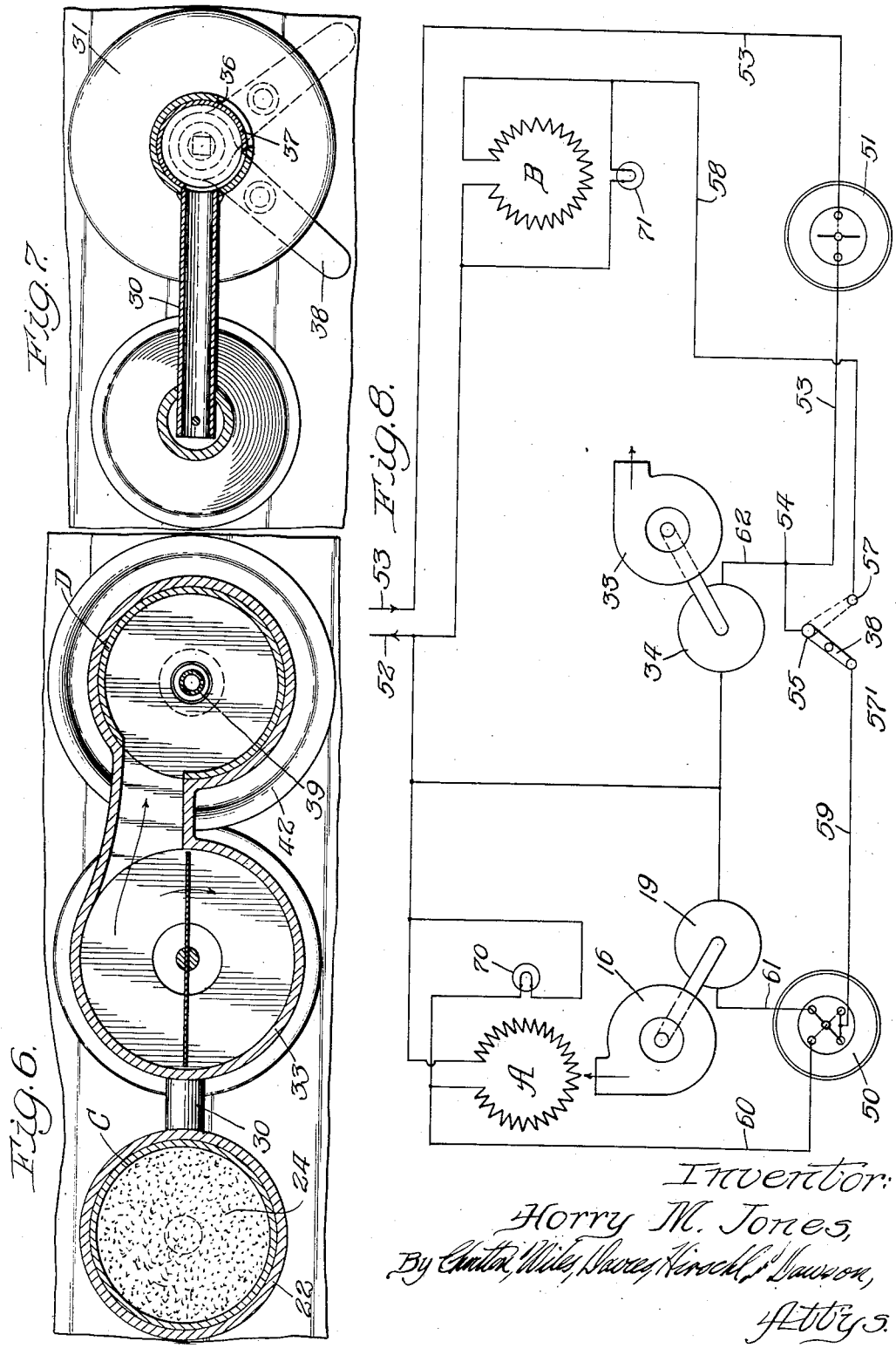

Patented Feb. 21, 1939

2,148,203

UNITED STATES PATENT OFFICE 2,148,203

APPARATUS FOR CHEMICAL ANALYSIS

Horry M. Jones, Chicago, Ill.

Application January 17, 1938, Serial No. 185,418

5 Claims. (Cl. 219—20)

This invention relates to improvements in apparatus for chemical analysis and more especially such apparatus particularly adapted for urinalysis in determining the nitrogen metabolic rate. The apparatus may be employed, for example, in analyzing diluted urine by the regular Kjeldahl method for nitrogen determination.

Although, in describing the apparatus, I may refer especially to its usefulness for making urinalyses, it is to be understood that it may be employed in connection with other analyses and chemical processes. As a matter of fact, the apparatus and the parts thereof are so designed as to have a wide range of usefulness in connection with any analysis or other chemical process requiring the application of heat, cooling, purifying or condensing.

Among the features of the invention is the provision of electric heaters with cooling means, purifying means and condensing means interrelated, interconnected and controlled by automatic time switches to permit of high efficiency, and a wide range of uses. The particular construction, operation and interdependence of the various parts will be pointed out more particularly hereinafter.

Other features and advantages will appear more fully as I proceed with my specification.

In that form of device embodying the features of my invention shown in the accompanying drawings—

Fig. 1 is a view in front elevation of the apparatus; Fig. 2 is a top plan view; Fig. 3 is a view taken as indicated by the line 3 of Fig. 2; Fig. 4 is a view taken as indicated by the line 4 of Fig. 2; Fig. 5 is a view taken as indicated by the line 5 of Fig. 2; Fig. 6 is a view taken as indicated by the line 6 of Fig. 5; Fig. 7 is a view taken as indicated by the line 7 of Fig. 5; and Fig. 8 is a wiring diagram.

As shown in the drawings, the various parts of the apparatus are mounted on a rectangular sheet metal base having an open bottom and a slanting front wall. The base I have indicated in general by the reference numeral 10; 10a indicating the top surface thereof, 10b and 10c the side walls, 10d the rear wall, and 10e the slanting front wall.

Mounted on the base 10 are two electric heaters A and B. These are similar in construction. One is shown in section in Fig. 4. The heater includes a heating unit 11 surrounded by an open top shell 12. The unit is provided with an Edison type plug 13 adapted to be screwed into a suitable socket 14 mounted on the upper surface 10a of the base 10. The unit is adapted to hold a container of liquid to be heated; for example, an Erlenmeyer flask 15.

The heater A is provided with cooling means comprising a centrifugal blower 16 mounted in the base 10 below the heater. The discharge outlet 16a of the blower is adapted to discharge air upwardly around the heating unit 11 to cool the flask 15 when the heater is off. For the purpose of directing the air where intended, the socket 14 is surrounded by a cylindrical casing 17 acting as a conduit for the cooling air from the blower to the openings 18 in the lower part of the shell 12. Air entering these openings below the heating unit 11 passes upwardly around the heating unit 11 inside of the shell 12 and then out of the top of said shell 12. This air, it will be seen, is brought into contact with the side walls of the flask 15 as it leaves the shell 12 and therefore will cool the flask and its contents. 19 indicates an electric motor for operating the blower 16. 20 indicates the air inlet for the blower.

21, 21 indicate openings in the side walls of the base permitting air to enter the base and also serving as hand holes for carrying the apparatus.

The heater B is similar to the heater A except that there is no blower under it and no cooling means provided for it.

C indicates a vertical tube or cylinder resting in the cup 22 provided with the screen 23 in the bottom thereof. The tube C may be termed in general a purifying or treating tube as it is adapted to contain any suitable substance 24 for purifying or treating the gases or fumes issuing from the flask 15 when the latter is heated. In order to direct the fumes into the tube the top of the flask is provided with a suitable stopper 25 in which is inserted a tube 26 leading to the stopper 27 in the cap 28 on the upper end of the tube C. The lower end of the cup 22 is provided with an outlet 29 for venting the purified or escaping gases or fumes into the pipe 30 which in turn leads to the larger pipe 31 closed at the lower end and having its upper end connected to the inlet 32 of a centrifugal blower 33 operated by the motor 34. The blower 33 discharges into the bottom of the tube D which has an outlet to atmosphere at the top as indicated by 35. By way of example, it may be stated that the substance 24 in the tube C is alkali for the treatment of fumes issuing from a heated mixture of urine and sulphuric acid in the flask 15 for the purpose of neutralizing acid fumes issuing therefrom.

For the purpose of withdrawing gases or fumes from the flask 15 while the contents thereof are being heated and causing said gases or fumes to pass through the substance 24, the blower 33 is operated to cause a suction through the tube C. The fumes or gases issuing from the tube C are drawn through the blower and discharged through the tube D and out through the outlet 35 to atmosphere. The pipe 31 is provided with a vent to atmosphere 36 adapted to be closed by a shutter valve 37 operated by the hand lever 38. The vent 36 is preferably closed when the blower 33 is operated to draw gases or fumes through the tube C.

Inside of tube D is a condenser 39, the upper end of which is connected by the tube 40 to a flash 15' on the heater B. The lower end of the condenser tube 39 discharges through the inverted funnel 41 into the dish 42. When the condenser is being used the vent 36 is preferably open so that the blower 33 may draw air from atmosphere and pass the same upwardly through the tube D around the condenser coil 39 to cool the same. With this construction, the heater B may be utilized with the condenser 39 to distill liquid in the flask 15'.

There will now be described the time switches and electric hookup together with the interdependence and interrelation of the different parts of the apparatus. 50 and 51 indicate time switches mounted on the front wall of the base. A description of the operation of these switches will be best understood by reference to the wiring diagram of Fig. 8. The wires 52 and 53 are adapted to be connected to a suitable source of electric energy through the receptacle 54 in the back of the apparatus adapted to receive the usual plug 55 which may be connected, for example, to a suitable 110-volt A. C. or D. C. supply for which the heaters and motors of the apparatus are adapted. The wire 53 leads through the time switch 51 to the central terminal 54 which is connected to a two-way switch 55 operated by the lever 38 which is the same lever that controls the opening and closing of the vent 36 in the pipe 31. The switch lever 38 is adapted to connect the terminal 54 with either the terminal 57 connected by the wire 58 to the heater B or the terminal 57' connected by the wire 59 to the other time switch 50. The time switch 50 is adapted to connect the wire 59 either to the heater A through the wire 60 or to the motor 19 through the wire 61. The terminal 54 is also connected through the wire 62 to the motor 34. The time switch 51 is shown open in solid lines and the wire 53 is "broken" when the switch is in this position. When in closed position as indicated by broken lines the circuit through the wire 53 is closed. The time switch 50 is shown in solid lines connecting the wire 59 to the wire 61 to operate the motor 19. When in the position indicated by the broken lines the wire 59 is connected to the wire 60 to operate the heater A. The heaters A and B are provided with suitable pilot lights 70 and 71 respectively.

The time switch 51 is normally in open position as indicated by the solid line, and the time switch 50 is normally connecting the wire 59 to the wire 61 as indicated by the solid line. Each of the time switches is adapted to be turned to the dotted line position and stay in such position the length of time for which the switch is set. Upon expiration of such predetermined time the switch will assume the solid line position.

By the construction shown, various modes of operation of the apparatus are permitted. It will be seen, however, that whenever the time switch 51 is open the entire apparatus will be inactive. That is, all power will be shut off so that neither heater nor blower will operate.

When the lever 38 is moved into the position indicated by the broken lines, heater A and blower 16 will be shut off; but heater B and blower 33 will operate as long as the time switch 51 is closed. When in this position the apparatus may be used for distilling any liquid on the heater B. That is, the heater will heat the liquid to discharge condensible gases into the condenser 39 and the blower 33 will operate to draw in cooling air through the vent 36 and pass it up around the condenser tube.

With the lever 38 in the position indicated by the solid line, the vent 36 is closed and blower 33 is operated to withdraw any gases or fumes escaping from the bottom of tube C. These are discharged up through the tube D around the condenser 39 and to atmosphere through the opening 35. It is not contemplated, however, that the passage of these gases around the condenser tube 39 will be utilized for cooling such tube. With the lever 38 in the solid line position the heater A will also operate as long as the time switch is in the position shown by the broken lines. When this switch moves into the solid line position the heater A will be shut off and the blower 16 will automatically start to cool the container 15 on such heater.

It will be seen, therefore, for example, that time switch 51 may be set for forty-five (45) minutes, the lever 38 put in the solid line position and time switch 50 set for thirty (30) minutes. Any substance on heater A will therefore heat for thirty (30) minutes during all of which time blower 33 will operate to withdraw fumes issuing from the container 15. At the end of thirty (30) minutes, time switch 50 will automatically move to the solid line position to shut off the heater A and simultaneously start the blower 16 to cool the flask 15. After fifteen (15) minutes more, that is, at the expiration of forty-five (45) minutes from the start, the time switch 51 will open to shut off everything. After this, if desired, the lever 38 may be moved to dotted line position, the flask 15 put on the heater B and the contents thereof distilled for any desired length of time. For example, if the distillation is to continue fifteen (15) minutes, the time switch 51 may be set for this time, during which the heater B will be heated and the blower 33 will operate to draw cooling air through the vent 36 and discharge the same around the condenser tube 39. At the expiration of the predetermined fifteen (15) minutes the switch 51 will automatically open to shut off the heater B and the blower 33.

80 indicates a manually operable time alarm that can be set at any predetermined time so that it will sound an alarm, for example, a bell, at the expiration of the time set. This may be used to call the attention of the operator to the apparatus at the expiration of any predetermined length of time.

While there are shown and described certain embodiments of the invention, it is to be understood that it is capable of many modifications. Changes, therefore, in the construction and arrangement may be made without departing from the spirit and scope of the invention as disclosed in the appended claims, in which it is intended to claim all novelty inherent in the invention as broadly as permissible, in view of the prior art.

What I claim as new, and desire to secure by Letters Patent is:

1. A base; a first heater on said base; a treating tube on said base; a second heater on said base; a condenser on said base; and a blower adapted to withdraw gases from a container on the first heater through the treating tube and discharge the same to atmosphere or cause a current of cooling air to flow from atmosphere around the condenser and back to atmosphere.

2. An electric heater; an electric blower adapted to deliver a current of cooling air to a vessel standing on the heater; a time switch adapted automatically to shut off the heater and turn on the blower at the expiration of a predetermined interval of time; and a second time switch controlling the current supply to the first time switch.

3. An electric heater; an electric blower adapted to deliver a current of cooling air to a vessel standing on the heater; an electric blower adapted to withdraw gases from a container on the heater and discharge the same to atmosphere; a time switch controlling the current supply to the heater and both blowers; and a second time switch adapted automatically to shut off the heater and turn on the cooling blower at the expiration of a predetermined time interval.

4. A first electric heater; a treating tube; a second electric heater; a condenser; an electric blower adapted to deliver a current of cooling air to a vessel standing on the first heater; an electric blower adapted to withdraw gases issuing from a container on the first heater, said blower also adapted to cause a current of cooling air to flow around the condenser; a vent adapted to admit air from atmosphere directly to said last mentioned blower; and means for opening said vent, said means operating automatically to shut off current to the first heater and the cooling blower when the vent is opened.

5. A first electric heater; a treating tube; a second electric heater; a condenser; an electric blower adapted to withdraw gases from a container on the first heater, said blower also adapted to cause a current of cooling air to flow around the condenser; a vent adapted to admit air from atmosphere directly to said blower; and means for opening said vent, said means operating automaticaly to shut off current to the first heater when the vent is opened.

HORRY M. JONES.